United States Patent
Lindskog et al.

(10) Patent No.: US 6,804,522 B2
(45) Date of Patent: Oct. 12, 2004

(54) HANDOVER IN CELLULAR SYSTEM UTILIZING NARROW AND WIDE BEAM ANTENNAS

(75) Inventors: Jan Lindskog, Pixbo (SE); Gunnar Rydnell, Rävlanda (SE); Timo Pohjanvuori, Göteborg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 628 days.

(21) Appl. No.: 09/796,362

(22) Filed: Mar. 2, 2001

(65) Prior Publication Data

US 2001/0031649 A1 Oct. 18, 2001

(30) Foreign Application Priority Data

Mar. 3, 2000 (SE) .............................................. 0000720

(51) Int. Cl.[7] ................................................ H04Q 7/20
(52) U.S. Cl. .................... 455/450; 455/522; 455/452.1; 455/562.1
(58) Field of Search .......................... 455/575.1, 562.1, 455/550.1, 446, 452.1, 447, 453, 450, 451, 522, 67.3, 422.1, 69, 464, 561, 509, 501, 13.4, 455, 436, 442, 403, 277.1, 277.2; 370/335, 342, 343, 330, 431, 436, 478, 277, 334, 329, 332, 337–338, 345–347; 342/359, 361

(56) References Cited

U.S. PATENT DOCUMENTS

| | | | |
|---|---|---|---|
| 4,779,267 A | * 10/1988 | Limb | ........................ 370/232 |
| 5,848,358 A | 12/1998 | Forssen et al. | |
| 5,966,094 A | * 10/1999 | Ward et al. | .................. 342/373 |
| 6,005,855 A | * 12/1999 | Zehavi et al. | ................ 370/335 |
| 6,108,323 A | * 8/2000 | Gray | ........................... 370/335 |
| 6,154,655 A | * 11/2000 | Borst et al. | .................. 455/451 |
| 6,167,283 A | * 12/2000 | Korpela et al. | ............. 455/525 |
| 6,349,217 B1 | * 2/2002 | Honcharenko et al. | .. 455/562.1 |
| 6,463,295 B1 | * 10/2002 | Yun | ........................... 455/522 |
| 6,526,036 B1 | * 2/2003 | Uchida et al. | .............. 370/342 |

FOREIGN PATENT DOCUMENTS

| | | |
|---|---|---|
| EP | 0526436 | 2/1993 |
| EP | 0660630 | 6/1995 |
| EP | 0926843 | 6/1999 |
| WO | WO98/33349 | 7/1998 |

* cited by examiner

*Primary Examiner*—Edward F. Urban

(57) ABSTRACT

The invention concerns a method for operating a cellular radio system having a base station comprising at least one antenna with a wide area beam and at least one antenna with a narrow area beam whereby only a limited number of channels (p) are available on the at least one narrow beam antenna. According to the invention, a number of narrow beam channels are assigned to a number of mobile terminals (t, n, N) according to estimated duty cycle values (α, β) on the up- and downlink channel for the respective mobile terminals in order to minimise interferences in the cellular system.

9 Claims, 1 Drawing Sheet

| Power | Power a | Scaled power a α=1; β=0 | Power b | Scaled power b α=0,5; β=0,5 | Power c | Scaled power c α=0; β=1 |
|---|---|---|---|---|---|---|
| Base omni | P_BOa = 10 W+3 dB (P_QoS)–3 dB (P_Link) = 10 W | 10 W | P_BOb = 10 W | 5 W | P_BOc = 10 W+3 dB (P_Link) = 20 W | 0 W |
| Base narrow (–10 dB compared to omni) | P_BNa = 1 W | 1 W | P_BNb = 1 W | 0,5 W | P_BNb = 2W | 0 W |
| Terminal omni | P_oa = 1 W | 0 W | P_ob = 1 W | 0,5 W | P_oc = 2 W | 2 W |
| Terminal narrow (- 10 dB compared to omni) | P_na = 0,1 W | 0 W | P_nb = 0,1 W | 0,05 W | P_nc = 0,2 W | 0,2 W |

| Power | Power a | Scaled power a α=1; β=0 | Power b | Scaled power b α=0,5; β=0,5 | Power c | Scaled power c α=0; β=1 |
|---|---|---|---|---|---|---|
| Base omni | P_BOa = 10 W+3 dB (P_QoS)–3 dB (P_Link) = 10 W | 10 W | P_BOb = 10 W | 5 W | P_BOc 10 W+3 dB (P_Link) = 20 W | 0 W |
| Base narrow (–10 dB compared to omni) | P_BNa = 1 W | 1 W | P_BNb = 1 W | 0,5 W | P_BNb = 2W | 0 W |
| Terminal omni | P_oa = 1 W | 0 W | P_ob = 1 W | 0,5 W | P_oc = 2 W | 2 W |
| Terminal narrow (– 10 dB compared to omni) | P_na = 0,1 W | 0 W | P_nb = 0,1 W | 0,05 W | P_nc = 0,2 W | 0,2 W |

HANDOVER IN CELLULAR SYSTEM UTILIZING NARROW AND WIDE BEAM ANTENNAS

FIELD OF THE INVENTION

This invention concerns generally the field of cellular communication for voice and packet data and in particular cellular communication systems utilising wide beam antennas and narrow beam antennas.

BACKGROUND OF THE INVENTION

Narrow beam base station antennas are widely used in for instance TDMA (Time Division Multiplex Access) systems and CDMA (Code Divison Multiplex Access) systems for providing a better spectrum utilisation.

Very narrow lobes can be accomplished by phase array antennas, which moreover may steer lobes in desired directions.

The frequency reuse distance within a cellular radio communication system is dependent on the C/I requirement (Carrier to Interference) for the deployed system. The C/I performance is dependent on modulation, decoding and information coding of the transferred information. The cross interference within a TDMA system originates from adjacent base stations within the frequency reuse pattern utilising the same frequencies. The reduction of cross interference and the cellular systems overall sensitivity to cross interference determines the reuse pattern. A tighter reuse pattern entails a higher cellular system capacity as is known in the prior art. In CDMA systems, the cross interference originates both from other users within the cell and from adjacent cells.

Thus, a typical remedy for dealing with increasing traffic in cellular networks is to introduce narrow beam antennas in base-stations having omnidirectional antennas thereby splitting the cell in sectors. Moreover, a cell, which already has narrow beam antennas, can be further sectorised by introducing even narrower beam antennas.

In typical systems, narrow beam antennas are not deployed in mobile terminals since such antennas are too complex for mobile terminals. However, using narrow beam base station receiving antennas also reduce uplink interference from mobile terminals since the mobile output power can be reduced due to the improved antenna gain.

In the following, we will use the terms narrow and wide beam in their comparative sense, i.e. a three sector antenna is a narrow beam in comparison to an omni-cell antenna and a five sector antenna is a narrow beam in comparison to a three sector antenna.

In the typical migration scenario, wide and narrow beam antennas will co-exist. Since the narrow beam antennas add complexity to the system and require resources from the base station, the channel capacity will typically be limited on the narrow beam antennas, whereby only a subset of the total traffic can be deployed on the narrow beam antennas. As an example, in a three sector base station each sector could be equipped with one phase array antenna dividing the sector into narrow beams in order to decrease the cross interference level. This technique has been further described in U.S. Pat. No. 5,848,358.

This raises the issue, which traffic channels shall be given priority to be deployed on narrow beam antennas.

The distance between the base station and the mobile terminal is one of the most important criteria for narrow beam intra cell hand-over since a higher output power level creates more interference. Moreover, since mobile terminals near the cell boundary tend to interfere with neighbour cells, a narrow-beam intra-cell hand-over from a wide beam to a narrow beam is often appropriate for terminals located far from the base-station.

In known systems, omni or three sector antennas covering the whole cell are for instance used in the initial part of a transmission and on broadcast channels. Depending on the characteristics of the transmission, an intra cell hand-over will be carried out in order to move the transmission to a narrow beam antenna.

According to prior art EP-A-0 526 436, the speed of a mobile terminal is a parameter, which is used for handover decisions. According to this document, fast moving mobile terminals are assigned to so-called umbrella cells, while stationary ones are assigned to micro cells.

Prior art document EP-A-0 926 843 shows a base-station arrangement having both omni directional antennas and narrow beam antennas. According to this solution, a connection shall be allocated to a narrow beam antenna, if this connection requires a higher QoS i.e. higher bit rate, in order to improve the link budget. This provides the opportunity for using a higher order of modulation or decreased correction coding which entail an increased throughput.

Prior art document U.S. Pat. No. 5,848,358 discloses various methods for performing intracell handover, i.e. handover between channels within a base station, whereby the cell is sectorised using array antennas.

According to one embodiment of the above method, a candidate mobile station for intracell handover is classified into power classes and spatial sectors. The channel allocation is carried out, such that mobile stations with approximately equal power levels and well separated sectors share the same channel.

According to another embodiment, the relative up-link interference on the mobile station and the relative up-link interference on other mobiles from the candidate mobile station as well as the downlink interference to existing downlinks are computed. From this information, the best channel and sector is chosen to a particular intra cell handover candidate.

SUMMARY OF THE INVENTION

The present invention seeks to provide a new method of optimising performance for cellular mobile telephone or data systems or a combination of telephone and data systems in which, wide beam and narrow beam antennas are used in combination.

This object has been provided by the subject matter defined by claim 1.

It is a further object of the invention to accomplish a method in which the interferences in a cellular system can be minimised.

This object has been accomplished by the subject matter according to claim 2.

It is a further object to accomplish an enhanced efficiency of reducing interferences in a cellular system.

This object has been accomplished by the subject matter according to claim 3.

It is a further object to set forth a method for reducing interferences in a cellular system, which is highly decentralised and is not adding any network control signalling between base stations and the network management system.

This object has been accomplished by the subject matter defined by claim 4. This object has also been accomplished according to respective claims 5 and 6.

Further advantages will appear from the following detailed description of the invention.

DETAILED DESCRIPTION OF PREFERRED EMBODIMENTS OF THE INVENTION

Figures 1, 2:
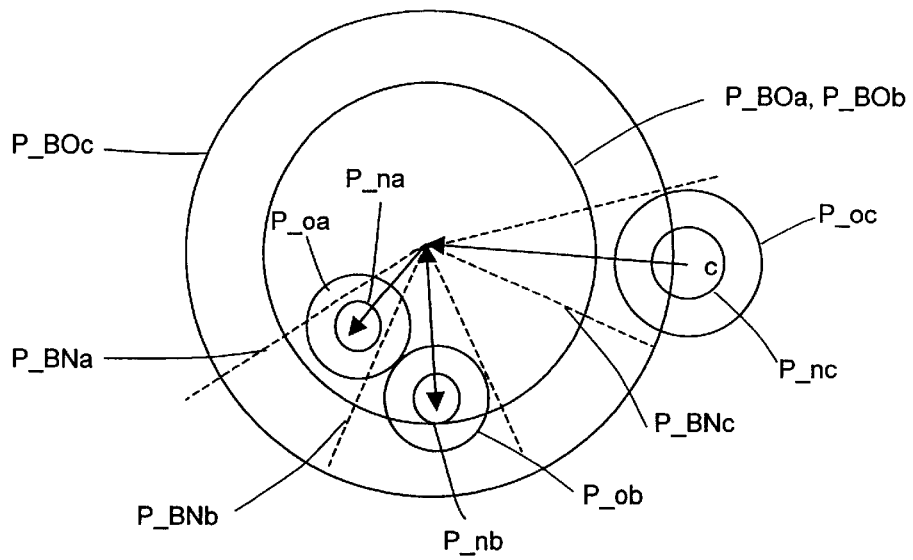
FIG. 1 is a schematic representation of an example of the invention.
FIG. 2 is a table representing emission power levels for various options of the example shown in FIG. 1.

In some systems, the non-used but allocated channel contributes with emission power and thereby noise and decreased signal to noise ratio for other users. For other systems, channels are utilised—that is, taking up time slots/bandwidth—to the extent the user transmits on the particular link. In a direct sequence CDMA system for instance, a voice activity factor determines to which extent the user contributes with emission power and thereby interferences.

According to the GSM (Global System for Mobile communication) or TDMA (IS-136) cellular mobile phone system, simultaneous traffic to and from a mobile is typically accomplished by using two allocated radio channels with a certain channel bandwidth on a duplex frequency distance. One channel is used for downlink traffic and the other channel is used for uplink traffic. The radio channels are divided into timeslots allowing several mobile terminals to share one allocated radio channel. For example in GSM, 8 time-slots are provided whereby up to 8 mobile terminals can communicate over one up- or downlink radio channel simultaneously. One time slot on the up-link and one time slot on the downlink is typically used to provide duplex voice traffic for a particular mobile terminal.

By introducing packet data traffic to digital cellular mobile telephone systems, also referred to as digital cellular mobile data systems, other traffic characteristics than duplex traffic will be deployed. The packet data traffic can utilise an arbitrary number of time slots, whereas voice by default only uses one.

Hence, packet data traffic often has an asymmetrical character with the main traffic in one direction, whereas voice typically has a symmetrical character.

In the following, we shall define the downlink duty cycle $\alpha$ as the actual utilisation of an allocated downlink channel in relation to the full channel utilisation or a predetermined utilisation level. The uplink duty cycle $\beta$ shall be defined as the actual utilisation of the allocated uplink channel in relation to a full channel utilisation or a predetermined utilisation level. The utilisation can for instance be defined in terms of number of time slots or bandwidth.

For a simplex channel where up- and downlink traffic utilise the same allocated radio channel, both $\alpha$ or $\beta$ can have values between 0.0 to 1.0 but the sum of $\alpha$ or $\beta$ is maximum 1. Typically, the overhead on the channel would lead to lower maximum values. On a duplex channel, both $\alpha$ and $\beta$ can be between 0.0 to 1.0 but the sum can be maximum 2.0. When a mobile terminal is browsing on the Internet in a packet data network $\alpha \approx 1$ and $\beta \ll 1$.

In the following, we shall use a transmitted power value for expressing the amount of interference caused to other users. For the up- and downlink traffic between mobile terminal and the base station, it applies that:

$$P\_downlink \sim P\_linkdown + P\_QoSdown + P_{13}bandwitdhdown - P\_antennagain$$

$$P\_uplink \sim P\_linkup + P\_QoSup + P\_bandwidthup - P\_antennagain$$

The transmission power P_down/up link depend on the required link budget, the required quality of service (bit rate) P_QoS which can vary if the modulation or coding scheme is altered depending on required Quality of Service (QoS), deployed allocated channel bandwidth, P_bandwidth, and the paths summarised antenna gain, P_antennagain, for the respective paths. All P values are logarithmic. P_linkup and P_linkdown, depends respectively on the receiver for up- and downlink sensitivity including path loss, interference rejection capability and power steering margin required to maintain the link in a mobile radio environment. It should be noted that the path loss for the uplink and the downlink are equal, while the receiver sensitivity differs between a base station receiver and a mobile receiver.

The power emissions from a base-station and corresponding mobile terminal can be expressed as:

$$P\_sum = \alpha \cdot P\_downlink + \beta \cdot P\_uplink$$

According to the invention, it is an object to minimise the power emissions relating to the candidate mobile stations seeking intra cell handover or inter, cell handover.

The invention shall now be explained with reference to FIGS. 1–2 in which a schematic example is shown.

FIG. 1, relates to a TDMA system in which three terminals—a, b and c—are candidates for handover to either an omni base station antenna or a narrow beam base station antenna. For instance, the narrow beam antenna is a steerable phase array antenna. The respective narrow beams have been indicated by the radial lines. FIG. 1 shows the unscaled power levels for various antenna options, whereby the areas indicated are illustrations of the emission powers and the directional characteristics for selected options. It should be noted that only some of the relevant power levels have been indicated and that the areas shown only represent schematic illustrations.

In the following example we assume that only one narrow beam channel is available and that only one candidate, a, b or c, can be selected for allocation of the narrow beam channel. We furthermore assume that the three candidates, a, b, and c, have varying P_link and P_QoS and that there are two antenna constellations with varying P_antennagain and that there is only one channel available on the narrow beam base station antenna. We assume furthermore that the narrow beam antenna has an improved antenna gain of 10 dB compared to the wide beam antennas. The mobile terminal cannot divide the traffic between two antennas, i.e. receive from the omni antenna and send to the narrow beam antenna.

Terminal a has negotiated a high QoS and requires all eight timeslots with the highest order of modulation which requires an additional +3 dB (P_QoS) transmitting power in order to keep an acceptable bit error rate and block error rate compared to terminal b and terminal c. Terminal a only receives traffic. Terminal a resides near the base station and requires 3 dB less (P:link) than terminal b. $\alpha=1$; $\beta=0$.

Terminal b both receives and transmits data on 4 timeslots in up- and downlink. A nominal bit-rate (QoS) is assumed. $\alpha=0.5$; $\beta=0.5$.

Terminal c only transmits data on 8 time slots in uplink. Nominal QoS (P_QoS) is assumed and the greater distance to base station requires 3 dB higher transmitting power (P_link) compared to terminal b. $\alpha=0$; $\beta=1$.

In FIG. 2 a table has been provided showing the emission power levels not adjusted by the $\alpha$ and $\beta$ values and the emission power levels showing the scaled power levels using the $\alpha$ and $\beta$ values.

Since only one channel on the narrow beam antenna is available in the above example, three choices exist for assigning the narrow beam antenna to one of the respective terminals, a, b, and c.

According to a preferred embodiment of the invention, the choice of allocating a handover candidate to a narrow beam antenna is made according to the total emission power levels for the various available combinations of antenna assignments:

$$P\_sum(x) = \sum_{n=1}^{N} (\alpha_n(x) \cdot P\_B_n(x) + \beta_n(x) \cdot P\_t_n(x))$$

where x represents a particular chosen assignment of terminals t to channels p on a narrow beam antenna, n represents a communication session relating to a particular mobile terminal, P_B(x) represents the power emission of the base-station to the particular mobile terminal in question and P_t(x) represents the power emission of the mobile terminal in question, whereby n∈[a,b,c . . . N]

In the above example shown in FIG. 1, the choice in which the sole narrow beam channel is assigned to terminal a, b or c, respectively, gives:

P_sum(a)=1+5+0.5+2=8.5W

P_sum(b)=10+0.5+0.05+2=12.55W

P_sum(c)=10+5+0.5+0.2=15.7W

In the above example, the narrow beam antenna channel shall be assigned to terminal a if a low total power emission (P_sum) is given priority.

According to the preferred embodiment of the invention, the selection of handover candidates is performed by.

determining the expected duty cycles ($\alpha$, $\beta$) on the up- and downlink channel for each mobile terminal, determining the possible combinations (x) of assigning mobile terminals (t) to available narrow beam channels (p), for each possible combination (x) calculating the total power emission value (P_sum(x)) from the power emission values of base-station (P_B) and the assigned mobile terminals (P_t) scaling each power emission value by the duty cycle in question, $$P\_sum(x) = \sum_{n=1}^{N} (\alpha_n(x) \cdot P\_B_n(x) + \beta_n(x) \cdot P\_t_n(x))$$

selecting a channel assignment combination (x) based on the total power emission value calculation, and performing a channel assignment in accordance with the selected combination, where x represents a particular chosen assignment of terminals t to channels p on a narrow band antenna, n represents a communication session relating to a particular mobile terminal, P_B(x) represents the power emission of the base-station and P_t(x) represents the power emission of the terminal.

Advantageously, the particular channel assignment combination, x, is selected giving priority to a low total power emission value or the lowest power emission value.

Observe that all P_sum including components are subject to fast changes due to mobile movements, new traffic requests, roaming mobiles, altered traffic type and other conditions. This points out the dynamical behaviour of the system and the requirement for continuous updates of which traffic link shall be assigned to the available narrow beam antenna channels.

The power values of mobile terminals not yet handed over are advantageously estimated according to the position of the mobile terminal and the prevailing general interference level in a particular area. Such data are obtainable from known NMS (Network Management System) systems or directly reported to base station from the terminal through a control channel. The quality of service and bandwidth is normally negotiated between the mobile terminal and base station where the base station can transfer the terminals requirements to a central system to authorise the terminals required transmission profile before initiation of traffic. From these data, respective power estimates can be established. This can be done very roughly or according to a detailed statistical model.

According to one embodiment, the expected $\alpha$, $\beta$ values reflect actual values wherein the expected duty cycle values are estimated from actual values of the duty cycle for particular mobile terminals. In packet data systems, data regarding the remaining number of packets in a particular transmission could be taken into account. Such data is typically available in packet data systems.

Alternatively, the expected duty cycle values $\alpha$, $\beta$ are estimated according to scheduled traffic parameters.

The expected duty cycle values ($\alpha$, $\beta$) could also be estimated by applying a stochastic process derived from the previous behaviour.

The merits of the invention are lowered interference levels, which enables to closer reuse patterns, which improves the overall system capacity. This again improves the possibilities to deploy a higher order of modulation to increase the radio channel bit rate, which leads to decreased channel coding and increased transferred bit rate.

Further Embodiments

When a first candidate, which decreases the interference power level most, has been allocated to the first available narrow beam antenna channel and the first candidate has an asymmetric behaviour, then a second candidate, having an asymmetric transmission character balancing the traffic in the other direction compared to the first candidate transmission, shall be allocated to the next available narrow beam antenna channel. This, in order to make the summarised transmission symmetric and to fully utilise the narrow beam antenna. This is off course only effective if the first and the second candidates reside within the same antenna beam. Preferably, the above matching are only accomplished for relatively static candidates.

According to a further embodiment, an alternative frequency reuse pattern is deployed for all Internet browsing services or other asymmetric services with a majority of the traffic in the downlink direction. When an Internet browsing transaction is detected, then an intra cell hand over can be carried out to a narrow beam antenna channel frequency with a very close reuse pattern.

The intra-cell handover according to the above method can be carried out on occasions where a mobile terminal experiences other known typical handover trigger situations, such as falling under a given BER (Bit Error Rate) threshold or a given received signal strength threshold, i.e. the handover criteria, which are typically employed when mobile terminals are moving from cell to cell.

Fast moving mobile terminals can be excluded from consideration as narrow beam handover candidates in order to obviate excessive fixed beam hand-overs or complicated steerable narrow beam control functions. Optionally, the angular speed of a given terminal in relation to the particular base-station the given mobile terminal is possibly handed over to, is used for this purpose.

According to a further embodiment of the invention, the power emission values from base stations are weighted with a regional noise factor in order to compensate for the interferences in regions or directions typically experiencing heavy interference. This regional noise factor is preferably based on statistical values.

What is claimed is:

1. Method for operating a cellular radio system having a base station comprising at least one antenna with a wide area beam and at least one antenna with a narrow beam, whereby only a limited number of narrow beam channels (p) are available on the at least one narrow beam antenna and the wide area beam and the at least one antenna with a narrow beam overlap, the base-station being adapted to assign the narrow beam channels to a number of mobile terminals (t, n, N), the method comprising the steps of:

determining the expected duty cycle values ($\alpha$, $\beta$) on the up—and downlink channel, respectively, for each mobile terminal, determining possible combinations (x) of assigning mobile terminals (t) to the available channels (p), for each possible combination (x) calculating the total power emission value (P_sum(x)) from the power emission values of the base-station (P_B(x)) and the assigned mobile terminals (P_t(x)), respectively, scaling the respective power emission values by the duty cycle ($\alpha$, $\beta$) in question, selecting a channel assignment combination (x) based on the total power emission value calculation, performing channel assignment in accordance with the selected combination.

2. Method according to claim 1, whereby the channel assignment combination is selected giving priority to a low total power emission value or the lowest power emission value (P_sum(x)).

3. Method according to claim 1, whereby the total power emission value (P_sum(x)) is calculated from the power emission values of the base-station (P_B(x)) and the assigned mobile terminals (P_t(x)), respectively, according to the following expression:

$$P\_sum(x) = \sum_{n=1}^{N} (\alpha_n(x) \cdot P\_B_n(x) + \beta_n(x) \cdot P\_t_n(x))$$

where x represents a particular chosen assignment of terminals t to channels p on a narrow band antenna, n represents a communication session relating to a particular mobile terminal, P_B(x) represents the power emission from the base-station to the particular mobile terminal in question and P_t(x) represents the power emission of the mobile terminal in question.

4. Method according to claim 1, whereby the mobile communication system relates to a packet data system and wherein the determined duty cycle values ($\alpha$, $\beta$) are estimated from remaining packets to be send in a session.

5. Method according to claim 1, whereby the determined duty cycle values ($\alpha$, $\beta$) are estimated from actual values of the duty cycle for particular mobile terminals.

6. Method according to claim 1, whereby the determined duty cycle values ($\alpha$, $\beta$) are estimated according to scheduled traffic parameters.

7. Method according to claim 1, whereby the determined duty cycle values ($\alpha$, $\beta$) are estimated by applying a stochastic process derived from the previous behaviour.

8. Method according to claim 1, whereby the power emission value from base stations (P_B) are weighted with a regional noise factor in order to compensate for the interferences in regions or directions typically experiencing heavy interference.

9. Method according to claim 1, whereby when a first candidate, which decreases the interference power level most is allocated to the narrow beam antenna and whereby the first candidate has an asymmetric behaviour, a second candidate, having an asymmetric transmission character balancing the traffic in the other direction compared to the transmission of the first candidate, is allocated to the narrow beam antenna.

* * * * *